(12) United States Patent
Hong

(10) Patent No.: US 7,209,471 B2
(45) Date of Patent: Apr. 24, 2007

(54) DATA TRANSFER METHOD FOR A BLUETOOTH SCATTERNET

(75) Inventor: Alexander T. P. Hong, Taipei (TW)

(73) Assignee: Institute For Information Technology, Taipei (TW)

( * ) Notice: Subject to any disclaimer, the term of this patent is extended or adjusted under 35 U.S.C. 154(b) by 936 days.

(21) Appl. No.: 10/434,199

(22) Filed: May 9, 2003

(65) Prior Publication Data

US 2004/0223475 A1 Nov. 11, 2004

(51) Int. Cl.
*H04J 3/24* (2006.01)
(52) U.S. Cl. .............. 370/349; 370/338; 370/254; 455/41.2; 455/419; 709/208; 709/228
(58) Field of Classification Search ............. 370/349, 370/338, 254; 455/41.2, 419; 709/208, 709/228
See application file for complete search history.

(56) References Cited

U.S. PATENT DOCUMENTS

| | | | |
|---|---|---|---|
| 6,751,200 B1 * | 6/2004 | Larsson et al. ............. 370/255 |
| 6,876,670 B1 * | 4/2005 | Budrikis et al. ............ 370/474 |
| 6,901,057 B2 * | 5/2005 | Rune et al. ................. 370/310 |
| 6,947,446 B2 * | 9/2005 | LoGalbo et al. ............ 370/468 |
| 6,975,613 B1 * | 12/2005 | Johansson .................... 370/338 |
| 7,016,336 B2 * | 3/2006 | Sorensen ..................... 370/351 |
| 7,058,050 B2 * | 6/2006 | Johansson et al. .......... 370/386 |
| 2003/0012219 A1 * | 1/2003 | Joo ............................. 370/449 |
| 2003/0140110 A1 * | 7/2003 | Cho ........................... 709/208 |

* cited by examiner

Primary Examiner—Danh Le
(74) Attorney, Agent, or Firm—Bacon & Thomas, PLLC

(57) ABSTRACT

A data transfer method transfers data between two bluetooth devices located in a bluetooth scatternet. The Upper Layer PDU to be transferred is divided into a group of packets which are suitable for baseband transmission. According to a link path table, a group of link identifications of the target device is selected. A link field length, link number and multiple link ID fields of the selected group of link identifications and bluetooth header are added into data packets. A dedicate link associated with link ID1 field of present transmitting data packet and transmitter queue which corresponding to the link is used to transfer the packet through baseband, radio frequency into wireless channel.

3 Claims, 7 Drawing Sheets

DATA TRANSFER METHOD FOR A BLUETOOTH SCATTERNET

BACKGROUND OF THE INVENTION

1. Field of the Invention

The present invention relates to the field of data transfer technology in a network and, more particularly, to data transfer method that is used in a bluetooth scatternet.

2. Description of Related Art

FIG. 1 shows a method for transferring data in a bluetooth network. The whole network is divided into several isolated piconets. In each piconet, there are one master bluetooth device and multiple salve bluetooth devices. The master device controls the data transfer procedure to and from the target slave device in a piconet. In the specification of bluetooth, a scatternet that is formed by multiple piconets is mentioned. However, in the specification, there is no rule and guideline provided for data transfer in a scatternet. As shown in FIG. 2, although all piconets can form a scatternet, in accordance with the current specification and technology of piconet and scatternet, data can only be transferred inside a specific piconet but not crossing the boundary of the piconet. That is, data cannot be transferred in a scatternet. Therefore, there is a need to have a novel design to transfer data in a scatternet that can mitigate and/or obviate the aforementioned problems.

SUMMARY OF THE INVENTION

The object of the present invention is to provide a data transfer method capable of transferring data in a scatternet based on the bluetooth technology, so as to remove the limitation of the current bluetooth technology that can only transfer data in a piconet.

To achieve the object, there is provided a data transfer method for transferring data between two bluetooth devices located in a bluetooth scatternet. The bluetooth device has an inter-link layer between a logical link control and adaptation protocol layer (L2CAP) and a baseband driver layer. The inter-link layer comprises multiple transmitter queues, a receiver queue and a link path table. The multiple transmitter queues correspond to relative links on the bluetooth device. The link path table has several groups of link identifications, each having multiple link ID fields. The method comprises: (A) dividing Upper Layer PDU by a segmentation & reassembly unit of the logical link control and adaptation protocol layer into a group of packets which are suitable for baseband transmission; (B) according to the link path table or present information, selecting a group of link identifications of a target device; (C) adding the link field length, link number and multiple link ID fields of the selected group of link identifications and bluetooth header into data packets; and (D) using a dedicate link associated with link ID1 field of present transmitting data packet and transmitter queue which corresponding to the link to transfer the packet through baseband and radio-frequency into wireless channel.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
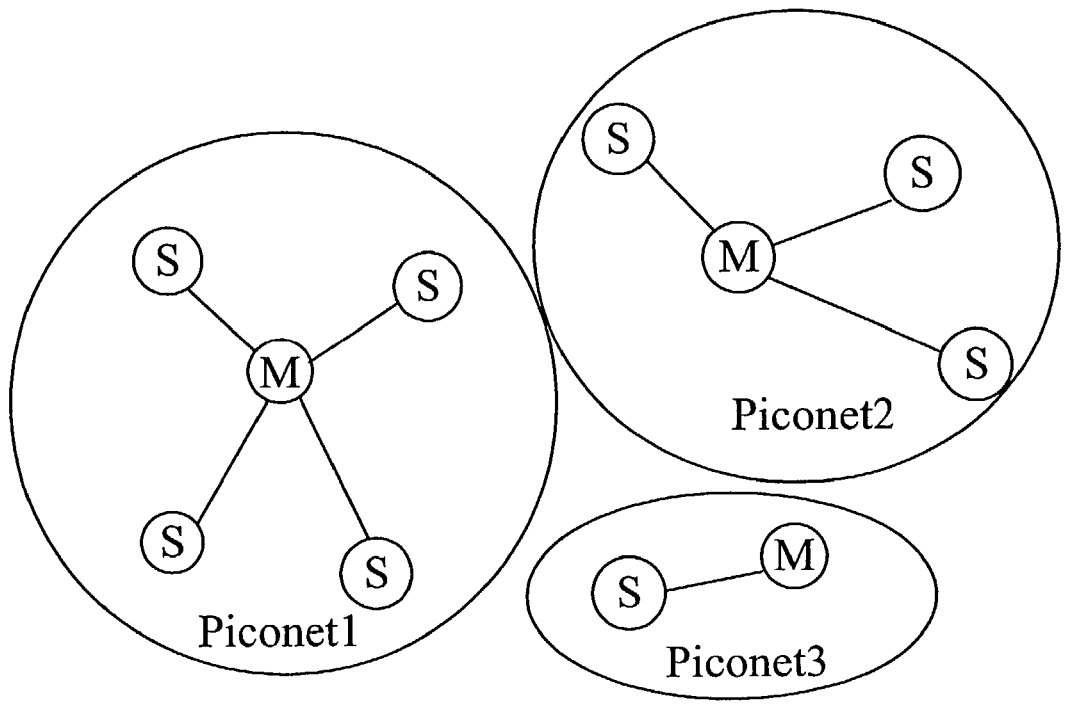
FIG. 1 shows the data transfer in a conventional bluetooth piconet.
Figure 2:
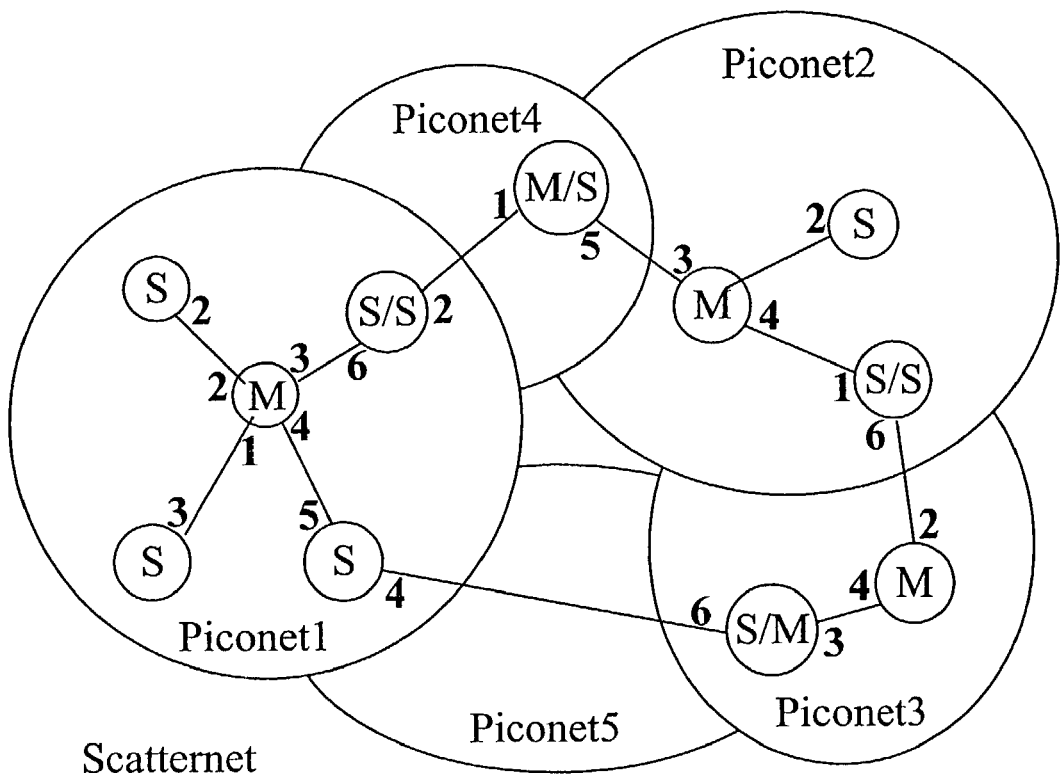
FIG. 2 shows multiple piconets form a scatternet in conventional bluetooth.
Figure 3:
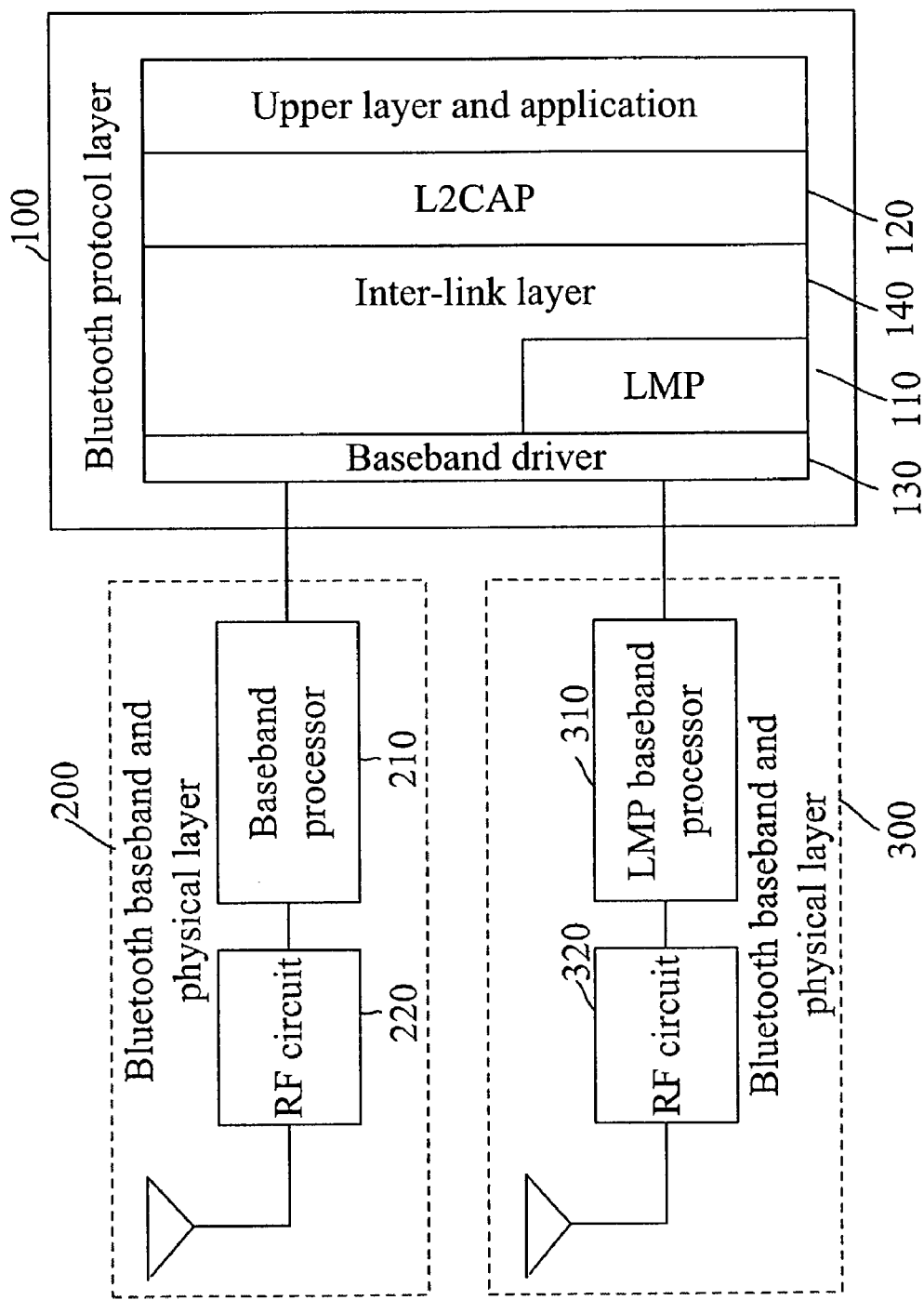
FIG. 3 shows a system architecture of a bluetooth device in accordance with the present invention.

Referring now to FIG. 3, there is illustrated architecture of a bluetooth device of the present invention. The device has a bluetooth protocol layer 100 and a bluetooth baseband and physical layer 200. The bluetooth protocol layer 100 has a logical link control and adaptation protocol (L2CAP) 120 and a link manager protocol (LMP) 110 and handles the corresponding protocol of bluetooth technology. The bluetooth baseband and physical layer 200 has a baseband processor 210 and a RF circuit 220 and handles the corresponding baseband and radio-frequency of bluetooth technology. When exhausting the bandwidth of bluetooth channel and affecting the data transmitting by executing the link search method, it can add a bluetooth baseband and physical layer 300, an inter-link layer 140, a baseband driver 130 as shows in FIG. 3. The bluetooth baseband and physical layer 300 executes exclusively for link manager protocol (LPM) and connects with the baseband drivers 130. The inter-link layer 140 provides an interface between the logical link control and adaptation protocol (L2CAP) 110 and the baseband drivers 130.

Figure 4:
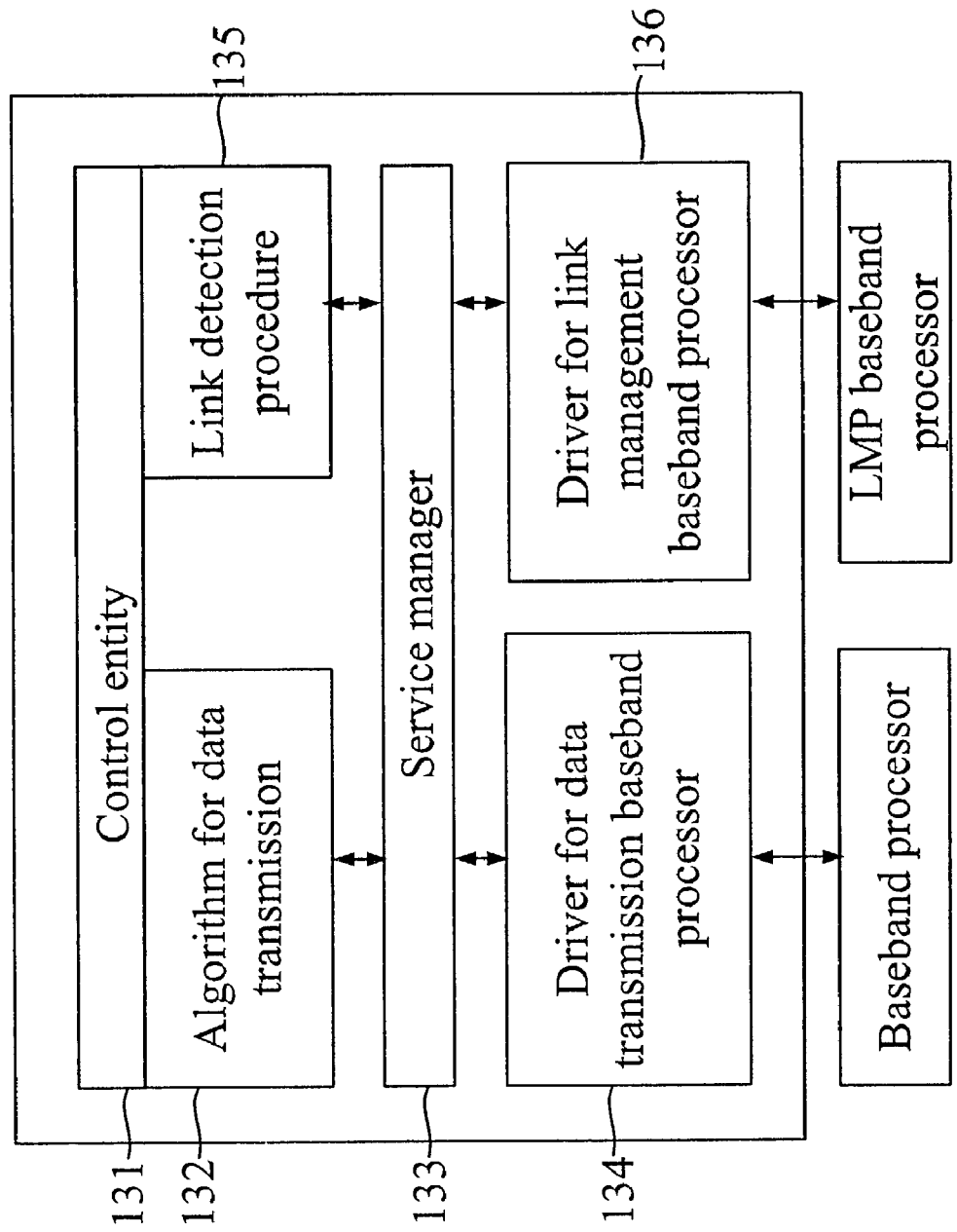
FIG. 4 shows an architecture of the baseband driver of the present invention.

FIG. 4 shows architecture of the baseband driver 130 of the present invention which comprises a control entity 131, an algorithm for data transmission 132, a service manager 133, a driver for data transmission baseband processor 134, a link detection procedure 135 and a driver for link management baseband processor 136. In comparison with the conventional bluetooth baseband driver, the link detection procedure 135 and the driver for link management baseband processor 136 are provided to execute the management of links for preventing the bandwidth of the data transmission from being reduced.

Figure 5:
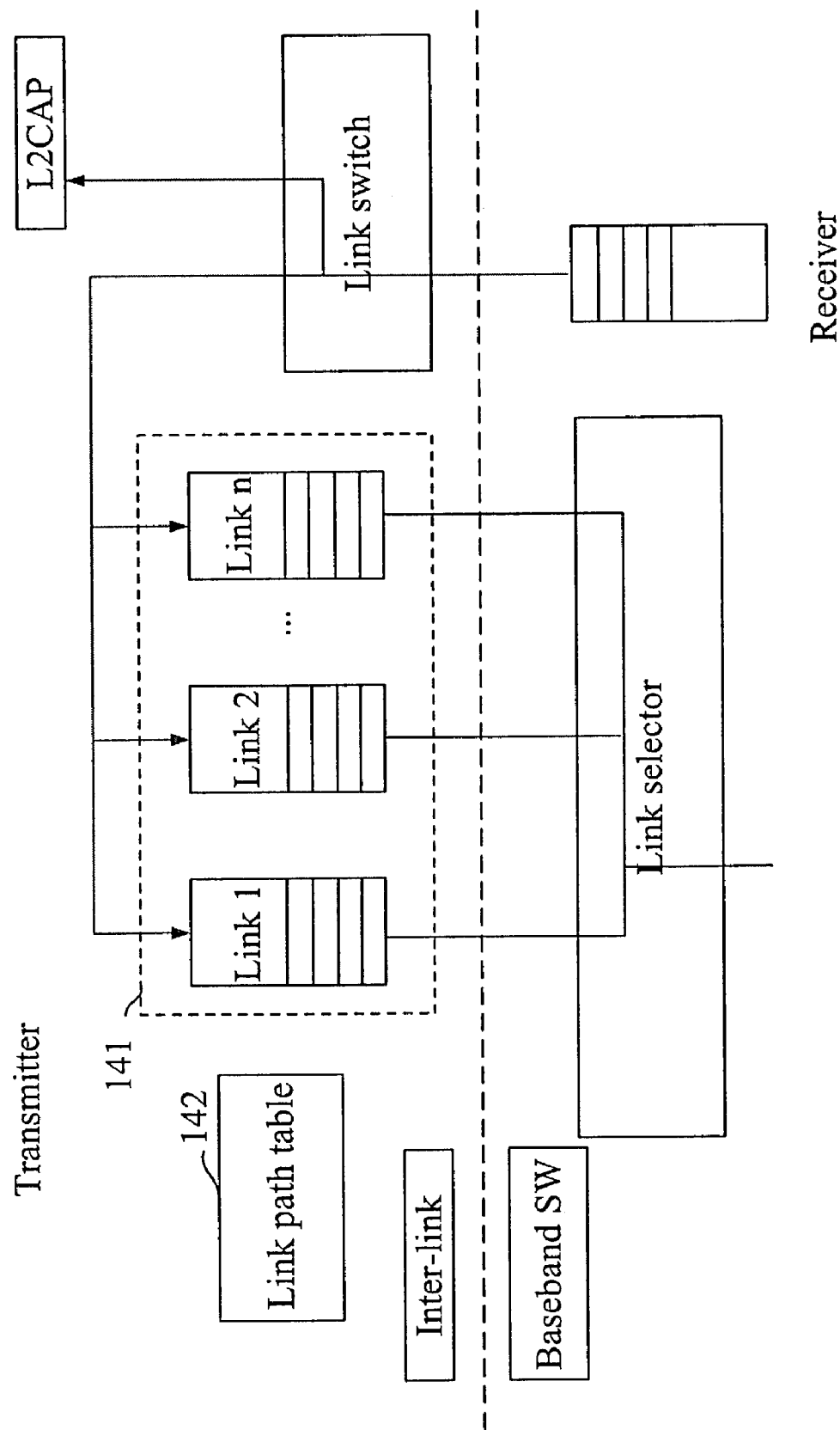
FIG. 5 shows an architecture of the Inter-link layer of the present invention.

FIG. 5 shows the architecture of the inter-link layer 140 of the present invention that comprises n transmitter queues 141 and a link path table 142. The n transmitter queues 141 are corresponding to the relative links of the bluetooth device. The link path table 142 has multiple link identifications, each having a link field length, a link number and multiple link ID fields.

Figure 6:
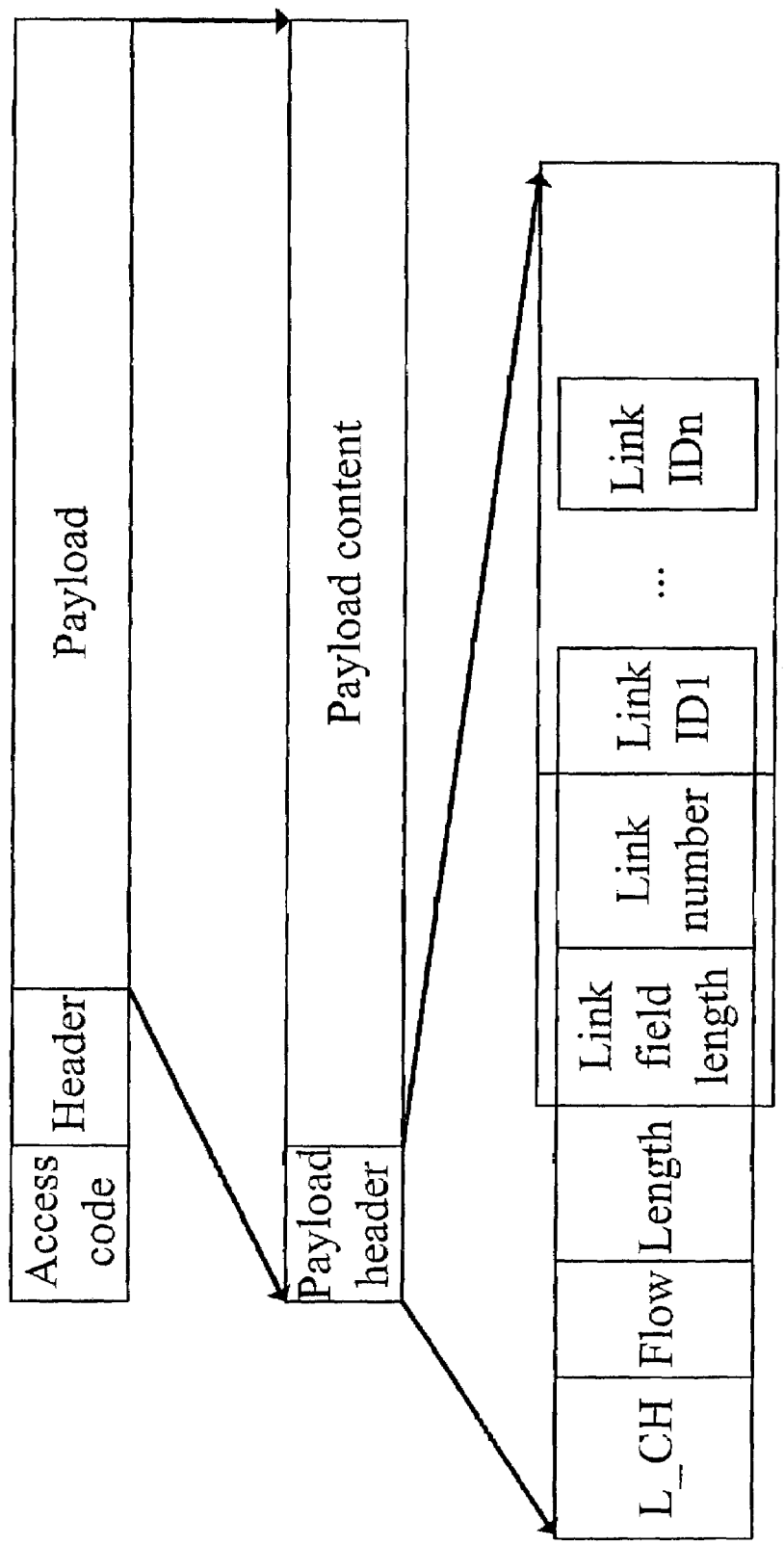
FIG. 6 shows the data packet format of the present invention.
Figure 7:
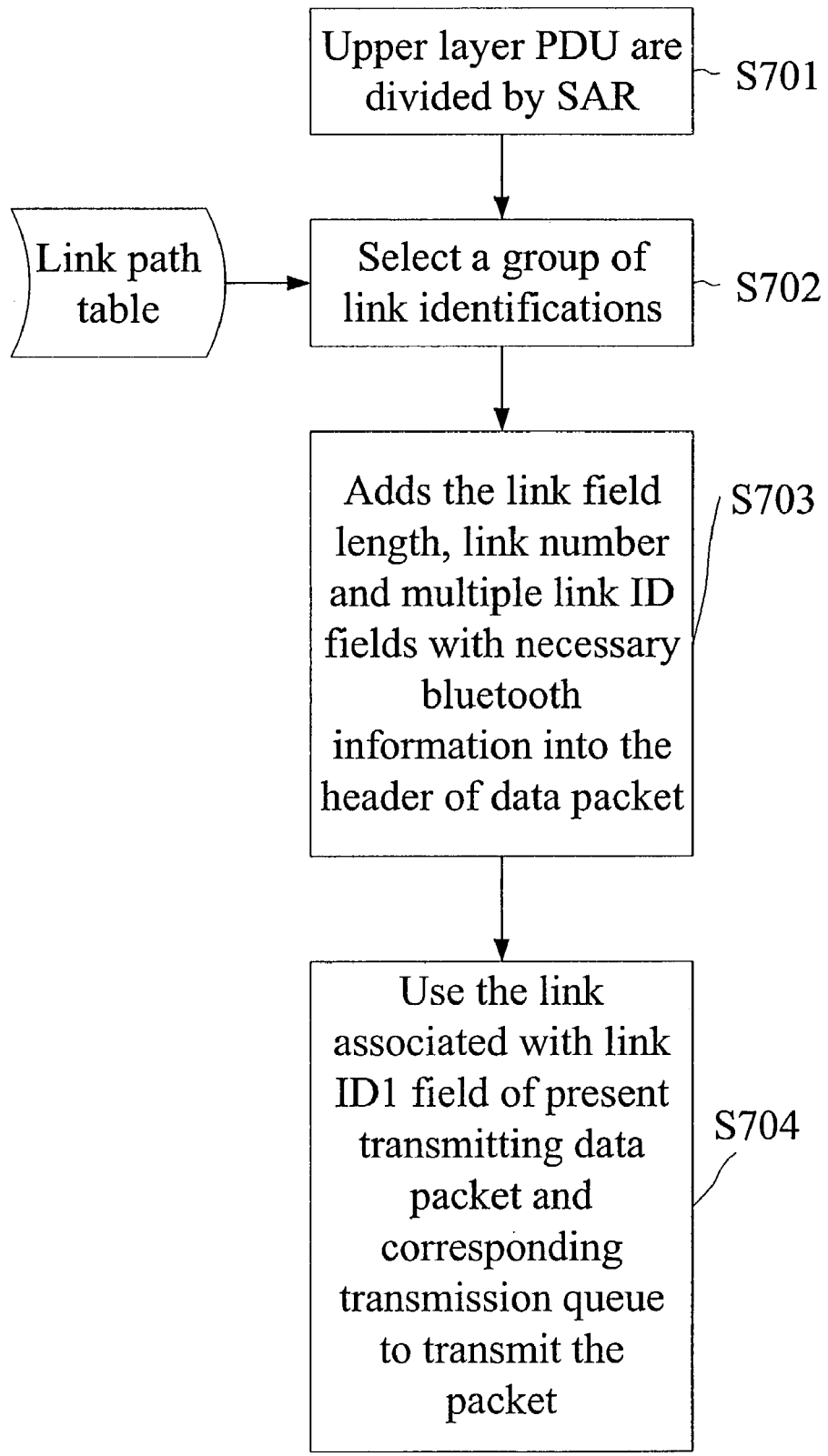
FIG. 7 shows the flowchart for transmitting data packet of the present invention.

FIG. 6 shows the data packet format of the present invention, there are a logical channel (L_CH), a flow, a length, a link field length, a link number, n link ID fields. The logical channel (L_CH), flow and length fields are defined by the bluetooth specification for data packet. The link field length, link number, n link ID fields are defined in the present invention to transmit data packet in a bluetooth scatternet. FIG. 7 shows the flowchart for transmitting data packet of the present invention. In the step S701, the transmitted Upper Layer PDU is divided by the segmentation & reassembly Unit (SAR) of the logical link control and adaptation protocol (L2CAP) layer into a group of packets that are suitable for baseband transmission. In step S702, according to the link path table, it selects a group of link identifications for the target device from the link path table. In step S703, it adds the link field length, link number and multiple link ID fields of the selected group of link identifications and bluetooth header into data packets header. The 0 in the link number field means that the packet is for broadcasting transmission, and non-zero is filled in this field for data transmission. In step S704, it uses a dedicate link associated with link ID1 field of present transmitting data packet and transmitter queue which corresponding to the link to transfer the packet through baseband processor 210, radio-frequency circuit 220 into wireless channel. The bluetooth device first transmits the data packet, and thus uses the link ID1 identification and corresponding transmitter queue to transmit the packet to baseband driver 130.

Figure 8:
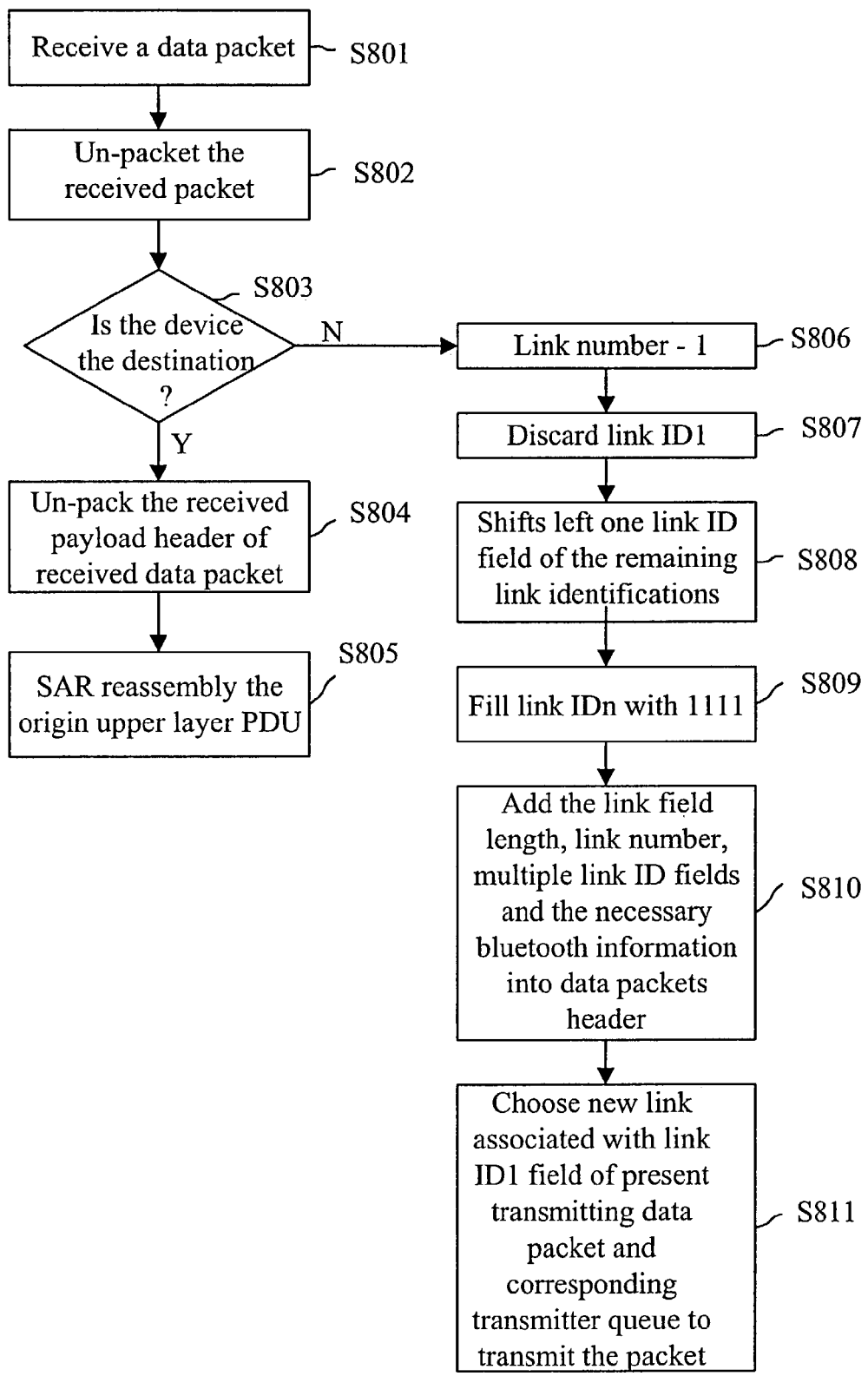
FIG. 8 shows the flowchart for receiving data packet of the present invention.

FIG. 8 shows the flowchart for receiving data packet of the present invention. In step S801, a bluetooth device receives a data packet through the wireless channel, radio-frequency circuit 220 and baseband processor 210. In step S802, it un-packs the received packet. In step S803, it determines whether the bluetooth device is the destination of the received packed or not.

If the bluetooth device is the destination of the data packet, the received data packet header is un-packed (step S804). In step S805, it re-assembly the data packet by the segmentation & reassembly unit (SAR) of the logical link control and adaptation protocol (L2CAP) layer to re-construct the origin Upper Layer PDU for being sent to upper layer.

If the bluetooth device is not the destination of the data packet, step S806 is executed to reduce the link number by 1 and step S807 is executed to discard the first link identification (Link ID1). In step S808, the remaining link identification fields are shifted left by one field. In step S809, it fills a value of 0b1111 into the n-th link identification field (Link IDn) to show the field is unused.

In step S810, it adds the link field length, link number and multiple link ID fields of the present combination of link identifications and bluetooth header into data packets header. The link number field should be filled with non-zero for data transmission. In step S811, the original link ID1 identification was discarded and it should choose a dedicate link associated with link ID1 field of present transmitting data packet and corresponding transmitter queue to transmit the packet to baseband driver 130.

In view of the foregoing, it is known that the present invention utilizes the steps in FIG. 7 and FIG. 8 to achieve the purpose of transferring data packets in a bluetooth scatternet, thereby removing the limitation of the conventional bluetooth technology that can only transfer data in a piconet.

Although the present invention has been explained in relation to its preferred embodiment, it is to be understood that many other possible modifications and variations can be made without departing from the spirit and scope of the invention as hereinafter claimed.

What is claimed is:

1. A data transfer method for transferring data between two bluetooth devices located in a bluetooth scatternet, the bluetooth devices having an inter-link layer between a logical link control and adaptation protocol layer and a baseband driver layer, the inter-link layer comprising multiple transmitter queues, a receiver queue and a link path table, the multiple transmitter queues corresponding to relative links on the bluetooth device, the link path table having multiple link identifications, each having a link field length, a link number and multiple link ID fields, the method comprising:

(A) dividing data packet by a segmentation & reassembly unit of the logical link control and adaptation protocol layer into a group of packets which are suitable for baseband transmission;

(B) according to the link path table, selecting a group of link identifications of a target device;

(C) adding the link field length, link number and multiple link ID fields of the selected group of link identifications and bluetooth header into data packets; and (D) using the link and transmitter queue which corresponding to the link ID1 field of present transmitting data packet to transfer the packet through baseband and radio-frequency into wireless channel.

2. The data transfer method for transferring data between two bluetooth devices as claimed in claim 1, further comprising:

(E) receiving data packet via the wireless channel, radio-frequency and baseband for the bluetooth device that located in the scatternet;

(F) un-packing and checking the received data packet for determining whether the device is destination of the received data packet; and (G) assembling the data packet by the segmentation & reassembly unit of the logical link control and adaptation protocol layer to re-construct original Upper Layer PDU for being sent to upper layers.

3. The data transfer method for transferring data between two bluetooth devices as claimed in claim 2, wherein when step (F) determines that the device is not the destination of the received data packet, the following steps are executed:

(H) decreasing the link number field by one;

(I) discarding the first link identification (Link ID1);

(J) shifting left the remaining link identification fields by one field;

(K) filling value of 0b1111 into the n-th link identification field;

(L) adding the link field length, link number and multiple link ID fields of the present combination of link identifications and bluetooth header into data packets header; and (M) choosing a link associated with Link ID1 field of present transmitting data packet and corresponding transmitter queue to transmit the packet to a baseband driver.

* * * * *